United States Patent [19]

Clark et al.

[11] Patent Number: 4,807,502

[45] Date of Patent: Feb. 28, 1989

[54] TUBE CUTTING APPARATUS

[75] Inventors: Clifford D. Clark; Delbert L. Adkins, both of Mt. Clemens, Mich.

[73] Assignee: Bundy Corporation, Detroit, Mich.

[21] Appl. No.: 478,474

[22] Filed: Mar. 24, 1983

Related U.S. Application Data

[63] Continuation of Ser. No. 192,355, Sep. 30, 1980, abandoned, which is a continuation-in-part of Ser. No. 125,498, Feb. 28, 1980, abandoned.

[51] Int. Cl.$^4$ .............................. B23B 5/14; B23B 3/26
[52] U.S. Cl. ........................................ 82/53.1; 82/71; 82/76; 82/102
[58] Field of Search .................. 82/71, 76, 80, 92–96, 82/100–102, 53.1, 28 R, 20; 225/2, 4, 96.5; 30/97, 90.1, 90.2

[56] References Cited

U.S. PATENT DOCUMENTS

| | | |
|---|---|---|
| 849,147 | 4/1907 | Lewis . |
| 1,185,681 | 6/1916 | Kienzle . |
| 2,168,853 | 8/1939 | Abbey . |
| 2,186,061 | 1/1940 | Berg et al. . |
| 2,326,463 | 8/1943 | Johnston . |
| 2,675,076 | 4/1954 | Billetter . |
| 3,029,674 | 4/1962 | Southwell et al. . |
| 3,304,819 | 2/1967 | Pasternack . |
| 3,581,612 | 6/1971 | Jackman . |
| 3,600,991 | 8/1971 | Kojima . |
| 3,611,848 | 10/1971 | Sullivan et al. . |
| 3,752,019 | 8/1973 | Kaneko . |
| 3,771,393 | 11/1973 | Gatto et al. . |
| 3,772,945 | 11/1973 | Varga . |
| 4,111,346 | 9/1978 | Bertolette . |
| 4,279,182 | 7/1981 | Miyagawa ............................ 82/4 C |

FOREIGN PATENT DOCUMENTS

| | | |
|---|---|---|
| 2544633 | 4/1976 | Fed. Rep. of Germany . |
| 407665 | 6/1974 | U.S.S.R. . |

OTHER PUBLICATIONS

Advertising Literature and Drawings of Bertolette Machines, Inc., Torrington, Connecticut.
Advertising Literature and Description of Burr Oak Tool & Gauge Company, Sturgis, Michigan.

Primary Examiner—Frederick R. Schmidt
Assistant Examiner—William E. Terrell
Attorney, Agent, or Firm—Harness, Dickey & Pierce

[57] ABSTRACT

A tube cutting apparatus designed for use in severing predetermined lengths of stock from a continuously moving workpiece includes a reciprocating carriage assembly on which is supported a driving motor directly connected to a continuously rotating cutting assembly. The workpiece is fed to the cutting assembly through an axially extending bore in the motor shaft. In one embodiment, the driving motor is fitted with end plates having integrally formed guides thereon. The cutting assembly includes a plurality of pneumatically actuated pistons each of which has either a roller or a cutting wheel secured thereto, all of which cooperate to sever the predetermined lengths of stock from the workpiece. The pistons and associated cutting wheels and rollers are designed to be actuated into engagement in response to application of fluid pressure thereto and are retracted by operation of centrifugal force resulting from continuous rotation of the cutting assembly. In one embodiment, the cutting assembly is specifically designed for quick and easy removal and reinstallation so as to enable rapid changes between different size workpieces. An optional stop assembly is also provided which includes a ram assembly operative to assist in completing the severing operation and in ejecting the workpiece from the tube cutting apparatus upon completion of the cutting operation so as to reduce the possibility of jamming.

26 Claims, 3 Drawing Sheets

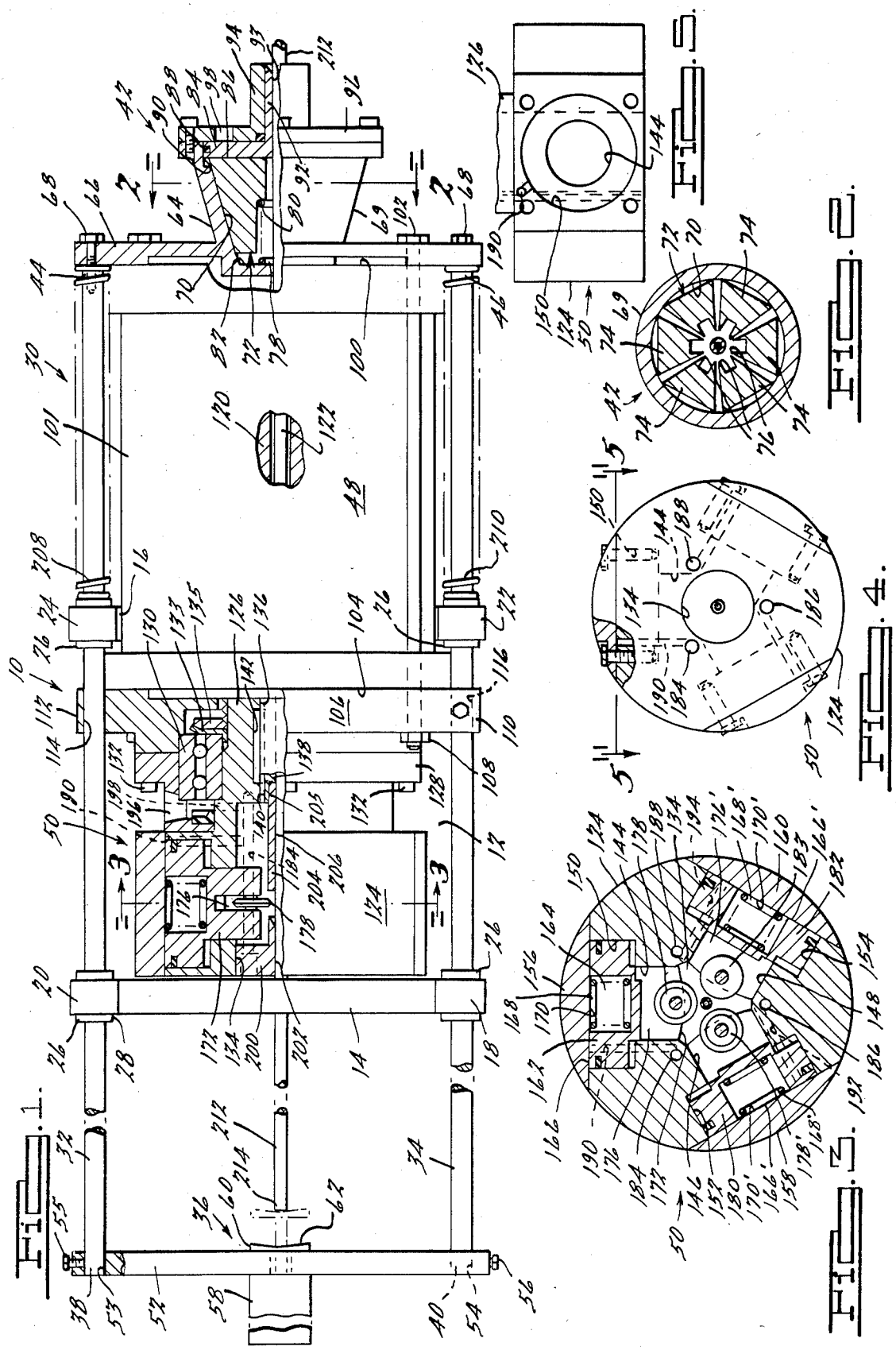

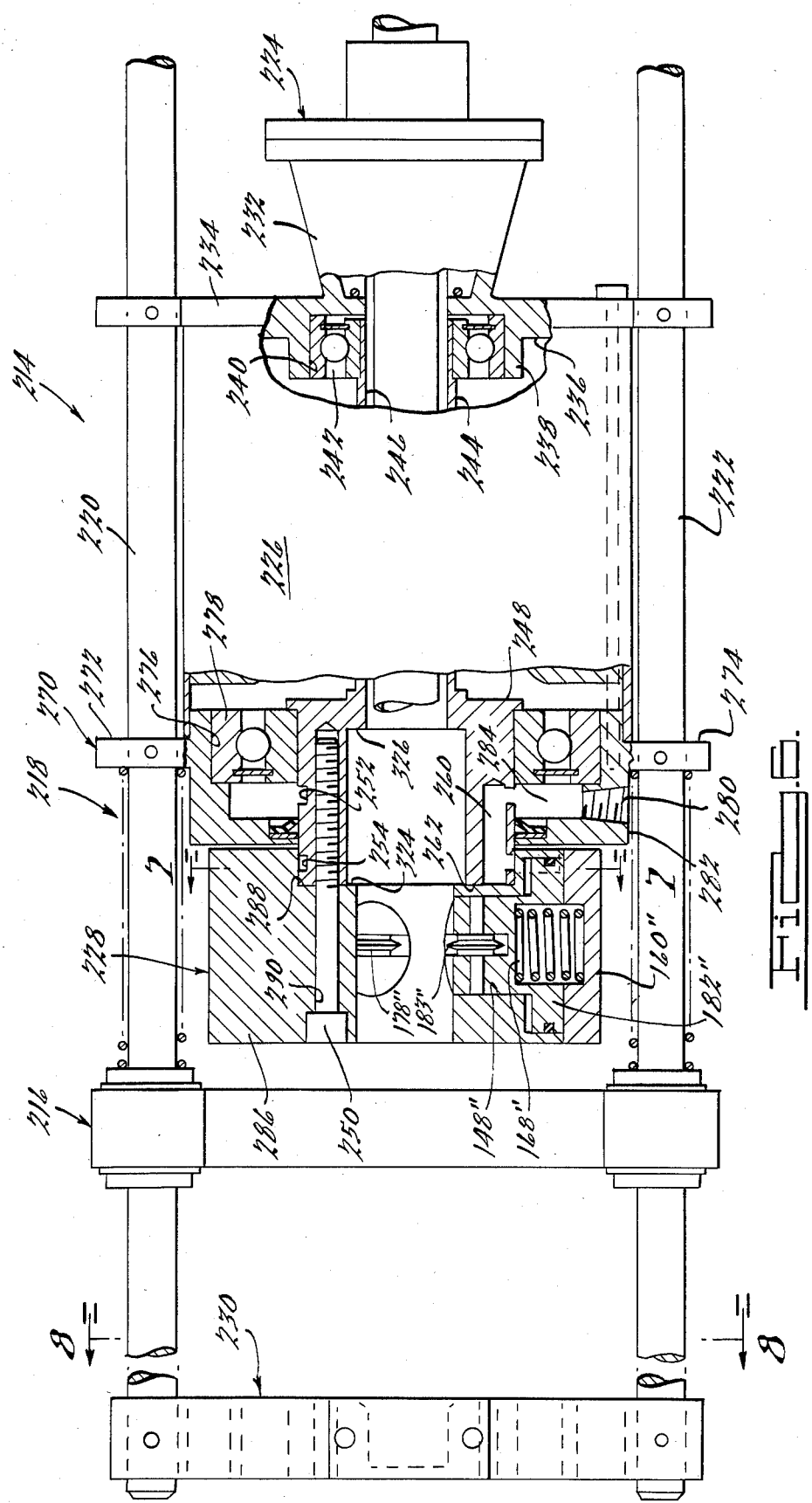

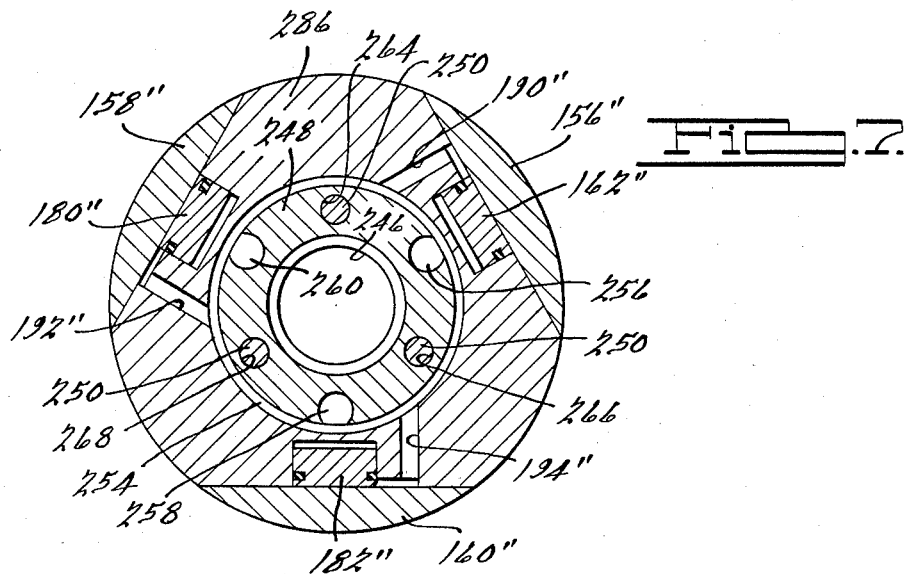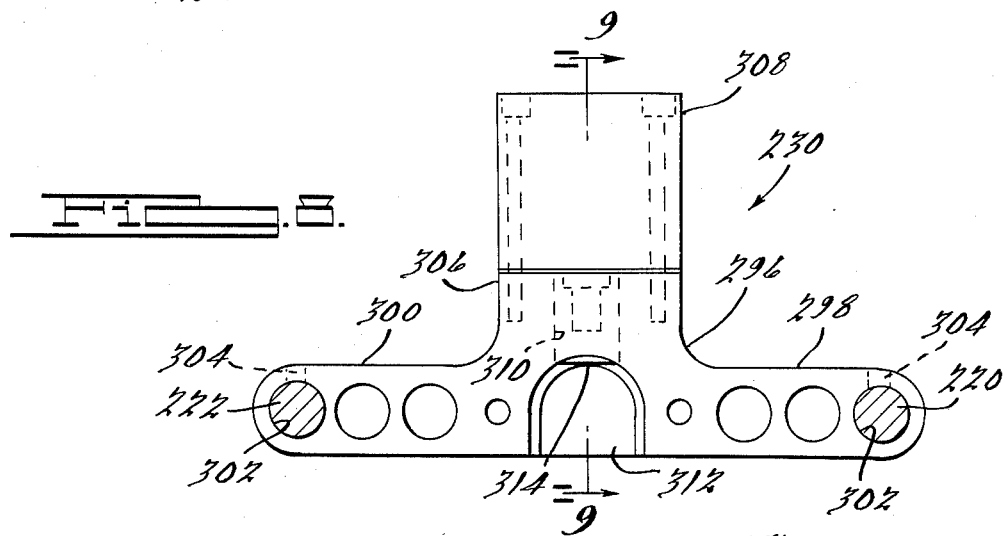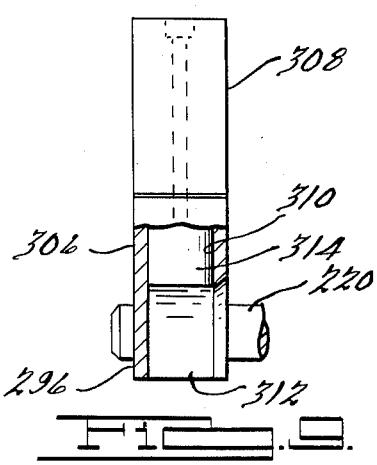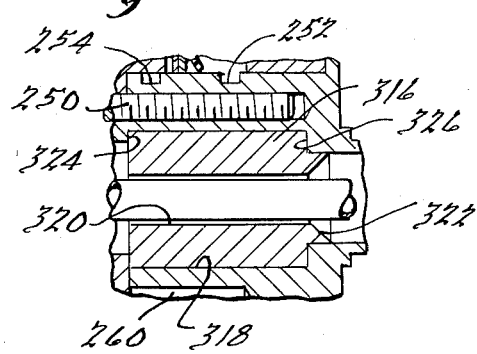

TUBE CUTTING APPARATUS

This is a continuation of application Ser. No. 192,355, filed Sept. 30, 1980, now abandoned, which is a continuation-in-part of Ser. No. 125,498, filed Feb. 28, 1980, now abandoned.

BACKGROUND AND SUMMARY OF THE INVENTION

The present invention relates generally to apparatus for use in severing predetermined lengths of stock from a workpiece and more particularly to such apparatus which is operative to sever predetermined lengths of tubing from a continuously moving workpiece.

In order to increase manufacturing speed, apparatus has been developed which is capable of severing predetermined lengths of tubing from a continuously moving supply. Such apparatus, more commonly known as flying cutoff machines, generally include a reciprocating carriage assembly having a cutting assembly mounted thereon and suitable motor means such as an electric motor adapted to rotatably drive the cutting assembly. Typically the motor is mounted on the carriage assembly adjacent but offset from the path of travel of the workpiece and the axis of rotation of the cutting assembly. Mechanical means, such as belts and pulleys, gears, or the like, are provided to transmit the rotational forces from the motor to the cutting assembly. While such mechanical power transmission devices are fully operable, the use thereof significantly increases the total mass which must be reciprocated in order to provide a flying cutoff capability. Because the rate of acceleration of an object is inversely proportional to the mass to be accelerated, this increased mass significantly reduces the maximum speed of operation of the machine. Further, such devices require periodic maintenance and, as with any operative device, are subject to potential failure both of which may result in increased operating costs and downtime.

In order to reciprocate the cutting means into and out of engagement with the workpiece, various gear and cam drive arrangements have been utilized along with suitable timing mechanisms operative to synchronize the actuation thereof. However, again such gear and cam drive arrangements require numerous parts and associated supporting structure all of which operate to increase the mass which must be reciprocated and thus may reduce the operating speed of the apparatus. Further, such arrangements may require periodic lubrication and inspection for wear so as to insure proper synchronized actuation thereof thus resulting in increased maintenance costs.

The present invention, however, overcomes these disadvantages by providing a relatively simple efficient tube cutting apparatus of the flying cutoff type which has a cutting assembly directly connected to the shaft of the driving motor. The motor shaft is provided with a bore extending therethrough through which the workpiece is fed to the cutting assembly. This arrangement eliminates the need for costly drive arrangements and serves to substantially reduce the reciprocating mass of the apparatus thereby enabling a higher production rate while also increasing the overall realiability of the machine and hence its productivity.

The cutting assembly of the present invention comprises a plurality of single action pneumatically actuated pistons each having either a cutting blade or roller wheel fitted to an inner end thereof which operate to sever predetermined lengths of the workpiece. The centrifugal force resulting from continuous rotation of the cutting assembly operates to smoothly and quickly retract the pistons after the cutting operation has been completed thereby eliminating the need to employ double action piston assemblies or other retraction means which would increase the mass of the apparatus.

In one embodiment, the driving motor is provided with end plates having integrally formed guide means thereon so as to eliminate the need for additional adapter plates or other supporting structure to attach the driving motor to the reciprocating carriage assembly. Additionally, the motor shaft is adapted to enable the cutting assembly to be directly secured thereto so as to enable rapid changing thereof thus allowing relatively short set up times for changing between different size workpieces.

Additionally, in some applications it is desirable to reduce the possibility of the cutting assembly forming objectionable burrs on the inside diameter of the tubing. One method of accomplishing this objective is to subject the workpiece to transverse loading just before the cutting means has fully severed the workpiece so as to cause it to snap or break at the partial cut line. The present invention may also be provided with a stop assembly secured to and movable with the carriage assembly which includes means to apply such transverse loading to the workpiece. Not only does this optional stop assembly operate to insure a clean burr-free severing of the workpiece from the supply but also provides means for positively ejecting the severed workpiece from the apparatus so as to enable the next section to be moved into position without damage or jamming of the apparatus.

Additional advantages and features of the present invention will become apparent from the subsequent description and the appended claims taken in conjunction with the accompanying drawings.

BRIEF DESCRIPTION OF THE DRAWINGS

FIG. 1 is a plan view of a tube cutting apparatus in accordance with the present invention with portions thereof being shown in section;

FIG. 2 is a sectioned view of the clamp assembly forming a part of the tube cutting apparatus of FIG. 1, the section being taken along line 2—2 of FIG. 1;

FIG. 3 is a sectioned view of the cutting assembly forming a part of the tube cutting apparatus of FIG. 1, the section being taken along line 3—3 of FIG. 1;

FIG. 4 is an end view of the cutting assembly of FIG. 3, shown in elevation with portions thereof broken away and the end plate and pistons removed therefrom;

FIG. 5 is a plan view of the cutting assembly of FIG. 1 with the cover member and piston assembly removed therefrom;

FIG. 6 is a plan view similar to that of FIG. 1 but illustrating another embodiment of a tube cutting apparatus in accordance with the present invention;

FIG. 7 is a sectioned view of the cutting assembly forming a part of the tube cutting apparatus of FIG. 6, the section being taken along line 7—7 thereof;

FIG. 8 is a sectioned view of the stop assembly forming a part of the tube cutting apparatus of FIG. 6, the section being taken along line 8—8 thereof;

FIG. 9 is a sectioned view of the stop assembly of FIG. 8, the section being taken along line 9—9 thereof; and FIG. 10 is a fragmentary section view of a portion of the tube cutting apparatus of FIG. 6 showing a guide bushing installed within one end of the drive shaft.

DESCRIPTION OF THE PREFERRED EMBODIMENTS

Referring now to the drawings and in particular to FIG. 1, there is shown a tube cutting apparatus in accordance with the present invention indicated generally at 10. Tube cutting apparatus 10 is designed primarily for use as a flying cutoff machine which operates to sever predetermined lengths of stock from a continuously moving workpiece although it should be noted that it may also function as a stationary cutoff machine if desired.

Tube cutting apparatus 10 comprises a base member 12 having a pair of generally U-shaped members 14 and 16 extending upwardly from opposite ends thereof and each of which has a pair of spaced supporting arms 18, 20, 22, 24, respectively. A suitable low friction sliding bearing means 26 is fitted within axially aligned openings 28 provided in the upper end of each arm 18 and 22 as well as in axially aligned openings provided in the upper end of arms 20 and 24 respectively.

A reciprocable carriage assembly 30 is also provided which includes a pair of elongated supporting carrier members 32 and 34 extending in substantially parallel spaced relationship, one of which extends movably through bearing means 26 provided in arms 18 and 22, and the other through bearing means 26 provided in arms 20 and 24.

Carriage assembly 30 further comprises a stop assembly 36 extending between and supportingly secured to ends 38 and 40 of carrier members 32 and 34, respectively, a clamp assembly 42 extending between and supportingly secured to the opposite ends 44 and 46 of carrier members 32 and 34, a driving motor 48 and associated cutting assembly 50 disposed between and supported on carrier members 32 and 34 intermediate the ends thereof.

Stop assembly 36 comprises an elongated supporting bar 52 having openings 53 and 54 extending therethrough adjacent opposite ends thereof and through which carrier members 32 and 34 extend. As shown, supporting bar has a pair of threaded locking bolts 55 and 56 extending inwardly into engagement with respective carrier members 32 and 34 which are operative to enable stop assembly to be adjustably secured in position along carrier members 32 and 34. A fluid pressure actuable cylinder 58 is secured to bar 52 intermediate the ends thereof and has a reciprocable stop member 60 including a workpiece engaging outer surface 62 projecting outwardly therefrom. Stop member 60 is movable between a retracted position as shown in FIG. 1 and an extended position as shown in phantom.

Clamp assembly 42 includes a clamp housing 64 having a radially outwardly extending flange portion 66 which is supportingly secured to end portions 44 and 46 of carrier members 32 and 34 by means of suitable fasteners such as bolts 68. Housing 64 includes a center portion 69 defining a generally frusto conically shaped chamber 70 within which a collet assembly 72 is movably disposed. Collet assembly 72 comprises a plurality of jaw segments 74 each having a pair of spaced radially inwardly projecting prong portions 76 adapted to engage and hold a workpiece in position, and biasing means in the form of a coil spring 78 extending between a forwardly facing surface 80 of jaw segments 74 and an inner surface 82 of housing 64. Spring 78 operates to bias jaw segments 74 away from surface 82 and into an open position as shown (to the right as seen in FIG. 1). Preferably jaw segments will be formed from a suitable material such as a rubber material so as to be able to securely grasp a workpiece without damaging the outer surface thereof. A piston 84 is movably disposed within a generally cylindrically shaped counterbore portion 86 provided in chamber 70 adjacent the outer end thereof and has an annular seal 88 provided thereon engaging sidewall 90 of housing 64. Piston 86 has an outwardly extending integrally formed tubular projection 92 having a bore 93 extending therethrough and which is disposed movably within a similar tubular projection 94 formed on an end plate which is secured to the outer end of housing 64. Suitable sealing means are also provided between tubular projections 92 and 94. An opening 98 is provided in end plate 96 which is adapted to have a pressurized fluid supply line connected thereto whereby pressurized fluid may be selectively applied to clamp assembly 42 so as to move piston 84 axially inwardly with respect to clamp housing 64 thereby urging jaw segments 74 into a closed clamping relationship with a workpiece extending therethrough. Upon release of the pressurized fluid, biasing spring 78 will operate to return jaw segments 74 to an open position as shown.

Driving motor 48 is supported between carrier members 32 and 34 having one end 100 of motor housing 101 thereof secured to flange portion 66 by a plurality of suitable fasteners such as bolts 102. The other end 104 of motor housing 101 has a supporting flange 106 secured thereto by bolts 108. Supporting flange 106 has a pair of radially outwardly extending diametrically opposed projections 110 and 112 each of which is provided with an opening 114, 116 through which respective carrier members 32 and 34 extend.

Driving motor 48 will preferably be electrically powered and includes a rotor assembly secured to an axially elongated shaft 120 rotatably supported within housing 101 and an associated stator assembly. As shown in FIG. 1, shaft 120 has a bore 122 extending axially therethrough which is positioned coaxially with the axis of rotation thereof and is aligned with bore 93 of clamp assembly 42.

Cutting assembly 50 comprises a generally cylindrically shaped housing 124 having an axially outwardly projecting portion 126 of a reduced diameter which is rotatably supported within a mounting flange 128 by suitable bearing means 130. A suitable locking washer 133 and locking unit nut 135 threadedly engages portion 126 and operates to retain housing 124 in assembled relationship with bearing means 130. Mounting flange 128 is in turn secured to supporting flange 106 by bolts 132.

Housing 124 has a bore 134 extending axially therethrough which is positioned coaxially with the axis of rotation thereof and includes a reduced diameter portion 136 extending through portion 126. The forward end portion 138 of motor shaft 120 is received within portion 136 of bore 134 and suitable keyways 140 and 142 are provided on shaft 120 and within portion 136 in which a suitable key is positioned so as to enable motor 48 to rotatably drive housing 124.

Housing 124 also includes three substantially identical radially extending bores 144, 146, and 148 opening radially inwardly into axially extending bore 134 and having enlarged diameter portions 150, 152, 154 at the outer ends thereof. Bores 144, 146, and 148 are preferably disposed in substantially equiangularly spaced relationship. Cap members 156, 158, and 160 are secured to housing 124 in overlying relationship to portions 150, 152, 154 respectively.

A fluid actuated piston 162 is movably disposed within portion 150 of bore 144 and has a radially inwardly extending recess 164 provided in the outer surface 166 thereof within which a spring 168 is disposed extending between inner surface 170 of cap member 156 and piston 162. Spring 168 is operative to bias piston 162 radially inwardly with respect to housing 124. Piston 162 also includes a reduced diameter portion 172 projecting radially inwardly through bore 144 and having a diametrically extending slot 176 provided therein. A cutting wheel 178 is rotatably secured within slot 176 and projects radially inwardly from the radially inner end of portion 172 of piston 162 so as to be engageable with a workpiece. As shown, the axially outwardly facing shoulder defined by the juncture between cylinder 144 and enlarged diameter portion 150 will operate to engage a radially inwardly facing shoulder portion of piston 144 so as to limit radially inward movement thereof.

Fluid actuated pistons 180 and 182 are also provided being movably disposed within respective portions 152 and 154 of bores 146 and 148 and which are substantially identical to piston 162 described above. Accordingly, corresponding portions thereof have been indicated by like numbers primed. However, piston 182 has a roller wheel 183 rotatably secured within slot 176' thereof rather than a cutting wheel.

In order to supply fluid under pressure to pistons 162, 180 and 182, housing 124 has three generally axially extending fluid passages 184, 186, 188 provided therein disposed in substantially equiangularly spaced relationship. A generally radially outwardly extending passage 190, 192, 194 is provided adjacent each bore 144, 146, 148 which is operative to conduct fluid from each of the axially extending passages 184, 186, 188 respectively to the area between respective pistons 162, 180 and 182 and cap members 156, 158 and 160 respectively. Mounting flange 128 has a radially outwardly extending opening 196 provided therein which is adapted to have a fluid supply line connected thereto. The radially inner end of passage 196 is in fluid communication with each of three spaced generally radially extending passages 198 which are operative to conduct fluid to each of axially extending passages 184, 186, 188.

The outer end of bore 134 has a plate member 200 secured therein having a bore 202 extending therethrough which is positioned coaxially with the axis of rotation of housing 124. Also, a generally cylindrically shaped member 204 is secured within an enlarged diameter counterbore 205 provided in the outer end of motor shaft 120 and a bore 206 extending axially therethrough also positioned substantially coaxially with the axis of rotation of housing 124. Plate member 200 and member 204 are operative to guide and support portions of a workpiece extending through respective bores 202 and 206 during operation of tube cutting apparatus 10.

Carriage assembly 30 is also provided with return means operative to bias it into a ready position as shown in FIG. 1. In the embodiment shown, the return means comprises a pair of helical coil springs 208 and 210 surrounding respective carrier members 32 and 34 and extending between arms 22 and 24 and flange portion 66 of clamp assembly 42.

In operation, a workpiece 212 such as a continuous length of tubing which is desired to be severed into a plurality of pieces of a predetermined length is continuously fed through bore 93 of clamp assembly 42 and through bore 122 provided in motor shaft 120 and bores 202 and 206 extending axially through respective member 204 and end plate 200, in cutting assembly 50 and into engagement with surface 62 of stop member 60 which will be in an extended position as shown in phantom in FIG. 1. Stop member 60 will operate as a fixed stop with regard to further advancement of workpiece 212 relative to carriage assembly 30. Thus, further advancement of workpiece 212 will operate to advance carriage assembly 30 relative to supporting members 18, 20, 22, and 24 (to the left as shown in FIG. 1). Suitable sensor means (not shown) are provided which will be actuated in response to initial movement of the carriage assembly 30 and will operate to actuate clamp assembly 42 by supplying a pressurized fluid such as compressed air or the like through opening 98 thereby urging piston 84 inwardly relative to chamber 70 so as to move jaw segments 74 into clamping engagement with workpiece 212. Alternatively, sensor means for controlling actuation of clamp assembly 42 may be provided on stop assembly 36 operative to sense engagement of workpiece 212 with stop surface 62. Cutting assembly 50 will be continuously rotatably driven by motor 48 and immediately after actuation of clamp assembly 42, pistons 162, 180 and 182 will be simultaneously actuated by pressurized fluid supplied thereto via respective passages 196, 198, 184, 186, 188, 190, 192, and 194 which will operate to advance pistons 162, 180 and 182 radially inwardly thereby moving cutting blades 178 and 178' and roller wheel 183 into engagement with workpiece 212. Immediately after engagement of clamp assembly 42 with workpiece 212 stop assembly 58 will be actuated to retract stop member 62 so as to provide a clearance whereby the severed length workpiece 212 may be moved outwardly from cutting assembly 50 upon completion of the cutting operation. Once the cutting operation has been completed, the pressurized fluid will be released and respective pistons 162, 180 and 182 will move radially outwardly in response to the centrifugal force due to continuous rotation of cutting assembly 50. Clamp assembly will also be released thereby once again allowing workpiece 212 to advance relative to carriage assembly 30. Return springs 208 and 210 which were compressed as a result of advancement of carriage assembly 30 during the cutting operation will now operate to return carriage assembly to the position shown in FIG. 1 in preparation for the next operation cycle. The severed portion of workpiece 212 will be pushed axially outwardly from cutting assembly 50 by combined relative advancement of workpiece 212 and return movement of carriage assembly 30 and allowed to drop out of cutting apparatus 10. Suitable collection means may be provided if desired. As soon as the severed portion of workpiece has been moved clear of cutting assembly 50, stop member 60 will be advanced into the position shown in phantom in FIG. 1 so as to receive the next end portion of workpiece 212 in preparation for the next operational cycle.

Preferably springs 168 and 168' will be selected so as to have a strength sufficient to provide assistance in advancing pistons 162, 180 and 182 radially inwardly during actuation thereof yet weak enough to enable the centrifugal force exerted on pistons 162, 180, and 182 due to rotation of cutting assembly 50 at substantially full operating speed of motor 48 to smoothly move them radially outwardly upon release of the pressurized fluid. The combination of the opposing actions of the centrifugal force and the biasing springs results in smooth efficient flutter free retraction of the pistons.

It should also be noted that stop assembly 36 is adjustably secured to respective carrier members 32 and 34. Thus, any desired predetermined lengths of stock may be severed from workpiece 212 by merely loosening locking bolts 55 and 56 and moving stop assembly to a position such that surface 62 of stop member 60 is spaced from cutting wheels 178, 178' a distance equal to the predetermined desired length.

Another embodiment of a tube cutting apparatus in accordance with the present invention is illustrated and will be described with reference to FIGS. 6 through 9. Tube cutting apparatus 214 is generally similar to tube cutting apparatus 10 described above and includes a supporting base assembly 216 (only a portion of which is shown) upon which a reciprocating carriage assembly 218 is mounted. Carriage assembly 218 includes a pair of elongated carrier members 220 and 222 reciprocably movably supported in substantially parallel spaced relationship on base assembly 216. A clamp assembly 224, a driving motor assembly 226, a cutting head assembly 228 and a stop assembly 230 are secured to and supported between carrier members 220 and 222.

Clamp assembly 224 is substantially identical in construction and operation to clamp assembly 42 described above and includes a clamp housing 232 having a radially outwardly extending flange portion 234 which includes openings through which respective carrier members 220 and 222 extend. In this embodiment flange portion 234 of clamp housing 232 also acts as one end plate of driving motor assembly 226. Inwardly facing surface 236 of flange portion 234 has an axially extending annular projection 238 which defines a bearing receiving cavity 240 into which a suitable bearing 242 is filtered. As shown, bearing 242 rotatably supports one end of a motor drive shaft 244 forming a part of motor assembly 226.

Driving motor assembly 226 preferably comprises a suitable electrically powered motor including a rotor secured to rotating drive shaft 244. Drive shaft 244 has a relative large diameter bore 246 extending axially therethrough through which a tubular workpiece is to be progressively advanced to the cutting head assembly 228. Drive shaft 244 has an enlarged diameter portion 248 formed on one end thereof which is designed to enable cutting head assembly 228 to be secured thereto by means of suitable threaded fasteners 250. A pair of axially spaced annular grooves 252 and 254 are provided on the periphery of enlarged diameter portion 248 each of which communicates with each of three bores 256, 258, and 260 extending axially inwardly from end 262 of portion 248. Bores 256, 258, and 260 are preferably substantially equally circumferentially spaced, have a length just slightly greater than the axial distance between groove 252 and end 262 and are radially positioned so as to slightly overlap grooves 252 and 254 so as to define an opening therebetween. An additional group of three bored 264, 266, and 268 are also provided extending axially inwardly from end 262 of enlarged diameter portion 248 which are adapted to receive threaded fasteners 250 so as to secure cutting head assembly 228 thereto. Preferably, bores 264, 266, and 268 will be positioned at a radius slightly less than bores 256, 258, and 260 and are substantially equally circumferentially spaced in alternating relationship therewith.

Motor assembly 226 also includes a second end plate 270 which includes a pair of oppositely extending arm portions 272 and 274 through which carrier members 220 and 222 respectively extend. A relatively large diameter bearing recess 276 is also provided into which bearing 278 is fitted so as to rotatably support end portion 248 of drive shaft 244 and cutting head assembly 228 secured thereto. Preferably, bearing 278 will be of the sealed type.

A radially inwardly extending opening 280 is also provided in a sidewall portion 282 of end plate 270 which is adapted to have a compressed air supply line connected thereto. Opening 280 communicates with an annular cavity 284 defined in part by end plate 270 and in part by bearing 278 surrounding enlarged diameter portion 248 of drive shaft 244 and in fluid communication with groove 252 provided thereon.

Similar to that described above with reference to tube cutting apparatus 10, suitable biasing means in the form of coil springs 221 and 223 are provided surrounding carrier members 220 and 222 respectively and extending between respective arms 272 and 274 and base assembly 216. Springs 221 and 223 will operate to bias the entire carriage assembly to the right as shown and will be compressed during a cutting operation by movement of the carriage assembly to the left as shown.

Cutting head assembly 228 is substantially identical to cutting head assembly 50 described above with the exception of a slightly modified housing 286. Accordingly, corresponding portions thereof have been indicated by like numbers double primed.

Cutting head assembly housing 286 is generally cylindrical in shape and includes an enlarged diameter counterbored recess 288 extending axially inwardly from one end thereof which is designed to receive a part of the enlarged diameter portion 248 of drive shaft 244. Also, a plurality of circumferentially spaced bores 290 are provided extending axially therethrough each of which is alignable with a threaded fastener 250 for securing cutting head assembly to drive shaft 244.

As best seen with reference to FIG. 7, counterbore 288 is of a depth so as to position generally radially extending passage 190', 192' and 194' provided in housing 286 in radial alignment with groove 254 so as to allow pressurized fluid to be conducted from passages 256, 258, and 260 to the radially outer ends of pistons 160', 180', and 182'. Also, as best seen with reference to FIG. 6, cap members 156", 158", and 160" each have a recess 292 provided therein which provides a seat to accomodate and retain biasing spring 168" in position.

As previously mentioned, a stop assembly 230 is also provided which includes a generally tee-shaped housing 296 having a pair of oppositely extending arms 298 and 300 each of which is provided with an opening 302 through which respective elongated carrier members 200 and 222 extend. Suitable locking means such as set screws 304 are also provided which are enageable with each of the carrier members so as to secure housing 296 in position thereon.

Housing 296 also includes a third arm 306 extending generally perpendicularly from arms 298 and 300 to which a suitable fluid actuated piston assembly 308 is secured. A bore 310 extends longitudinally through arm 306 opening into a generally inverted U-shaped recess 312 provided therebelow which recess is designed to receive one end of a workpiece to be severed from a supply of stock. Piston assembly 308 includes a ram 314 extending outwardly from the lower end thereof and into bore 310. Upon actuation of piston assembly 310, ram 314 will be moved downwardly as shown into recess 312 and into engagement with the workpieces positioned therein so as to exert a lateral force thereon operative to move the workpiece downwardly and out of recess 312 through the open bottom thereof.

The operation of tube cutting apparatus 214 is substantially the same as that of tube cutting apparatus 10 except that just before cutting wheels 183" and 178" completely sever the workpieces from the length of stock, piston assembly 308 will be actuated so as to move ram 314 into engagement with the opposite end of the workpiece. Ram 314 will exert a lateral or transverse force on the workpiece so as to assist in finishing the severing thereof by snapping the workpiece off at the location of cutting wheels 178" and 183". This snap action severing process has been found to result in substantial reduction of internal burrs in the severed workpiece thus reducing the need for subsequent reaming or the like. Additionally, the use of a ram on the stop assembly also aids in insuring that the workpiece being operated on will be ejected from the apparatus thereby clearing the area for advancement of the next length of stock so as to reduce the possibility of machine jamming.

Also, it should be noted that because the cutting head assembly is secured to the drive shaft only by three fasteners 250, it can be easily and quickly removed and replaced thereby enabling the tube cutting apparatus to be quickly adapted to cut different diameter workpieces. Additionally, as shown in FIG. 10, if desired a suitable generally cylindrical bushing 316 may be inserted within the enlarged diameter bore 318 provided within end portion 248 of shaft 244 so as to guide and support smaller diameter workpieces. As shown, bushing 316 will have a bore 320 extending axially therethrough of a diameter slightly larger than the diameter of the workpiece to be operated upon and which will be positioned coaxial with the axis of rotation of shaft 244. Also, in order to assist in guiding such smaller diameter workpieces therethrough the forward edge portion 322 of the bushing will be chamferred slightly. Bushing 316 of course will be retained in position by opposed end wall portions 324 and 326 of housing 286 and end portion 248 respectively.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A tube cutting apparatus comprising:
a supporting base;
motor means supported on said base, said motor means including a rotating shaft;
a rotatable cutting assembly directly connected to said rotating shaft and adapted to be driven thereby, said cutting assembly including a housing having a bore extending therethrough positioned substantially coaxial with the axis of rotation of said cutting assembly and cutting blade means radially movably disposed within said housing, said cutting blade means including a piston movably disposed within a cylinder and a cutting wheel secured to the radially inner end of said piston and movable into said bore and into engagement with said workpiece so as to sever a length thereof;
means engageable with said workpiece to enable relative rotation between said workpiece and said cutting assembly;
actuating means including passage means within said housing operative to conduct a fluid under pressure to said cylinder adjacent the radially outer end thereof for moving said piston radially inwardly with respect to said housing; and
biasing means operative to exert a radially inwardly directed biasing force on said piston,
said rotating shaft having a bore extending therethrough, said bore being positioned coaxially with said bore in said cutting means whereby a workpiece may be moved axially through said motor means and said cutting assembly.

2. A flying tube cutting apparatus comprising:
a supporting base;
a carriage assembly movably supported on said base;
motor means including a rotating shaft having a rotor secured thereto intermediate the ends thereof and a stator secured within a motor housing and surrounding said rotor and first and second end plates secured to opposite ends of said motor housing, said end plates supporting said motor means on said carriage assembly;
a rotatably cutting assembly supported by said motor means on said carriage assembly and including a rotatably housing engaging and directly removably connected to said rotating shaft and adapted to be directly driven thereby, said cutting assembly having a bore extending therethrough positioned substantially coaxially with the axis of rotation of said cutting assembly and cutting blade means radially movably disposed within said housing, said cutting blade means including a portion movable into said bore and into engagement with said workpiece so as to sever a predetermined length thereof;
said rotating shaft having a bore extending therethrough, said bore being positioned coaxially with said bore in said cutting assembly whereby a workpiece may be moved axially through said motor means and said cutting assembly;
means engageable with said workpiece to enable relative rotation between said workpiece and said cutting housing;
a stop assembly adjustably supported on said carriage assembly and spaced from said cutting blade means a predetermined distance, said stop means being engageable by an end portion of said workpiece whereby predetermined lengths of stock may be severed from said workpiece by said cutting blade means, said predetermined length being substantially equal to said predetermined distance.

3. A tube cutting apparatus as set forth in claim 2 wherein said cutting assembly is provided on one end of said motor and said means engageable with said workpiece comprise non-rotating clamp means supportingly secured to the other end of said motor, said clamp means being actuable to clampingly engage a workpiece extending therethrough while said cutting blade means operates thereon to sever said predetermined length.

4. A tube cutting apparatus as set forth in claim 2 wherein said workpiece is continuously moved relative to said base and is operative to advance said carriage assembly with respect to said base while said cutting blade operates to sever a said predetermined length.

5. A tube cutting apparatus as set forth in claim 4 wherein said carriage assembly further includes return biasing means operative to return said carriage assembly to a starting position after completion of said cutting operation.

6. A tube cutting apparatus as set forth in claim 2 wherein said first and second end plates enclose axially opposite ends of said motor means and said clamp means includes a clamp housing integrally formed with one of said end plates.

7. A tube cutting apparatus as set forth in claim 2 wherein each of said first and second end plates include bearing recesses formed therein and said motor means further comprises first and second bearings positioned within respective of said recesses for rotatably supporting said shaft, one of said first and second bearings being substantially larger than the other.

8. A tube cutting apparatus comprising:
a supporting base;
motor means supported on said base, said motor means including a rotating shaft;
a rotatable cutting assembly directly connected to said rotating shaft and adapted to be driven thereby, said cutting assembly having a housing with a bore extending therethrough positioned substantially coaxial with the axis of rotation of said cutting assembly and cutting blade means radially movably disposed therein, said cutting blade means including a portion movable into said bore and into engagement with said workpiece so as to sever a predetermined length thereof;
means engageable with said workpiece to enable relative rotation between said workpiece and said cutting assembly;
said rotating shaft having bore extending therethrough, said bore being positioned coaxially with said bore in said cutting means whereby a workpiece may be moved axially through said motor means and said cutting assembly; and
a stop assembly adjustably supported on said base and spaced from said cutting blade means a predetermined distance, said stop means being engageable by an end portion of said workpiece whereby predetermined lengths of stock may be severed from said workpiece by said cutting blade means, said predetermined length being substantially equal to said predetermined distance, said stop assembly including means engageable with said workpiece for exerting a lateral force thereon.

9. A tube cutting apparatus as set forth in claim 8 wherein said workpiece is a tubular member and said engageable means is actuated to exert a lateral force thereon just prior to complete severing of said predetermined length of said tubular member whereby said lateral force will separate said predetermined length.

10. A tube cutting apparatus as set forth in claim 9 wherein said engageable means comprises a fluid actuated piston assembly.

11. A flying cutoff machine for severing lengths of stock from a continuously moving workpiece comprising:
a supporting base;
carriage means movably supported on said base for reciprocable movement relative thereto;
motor means including a rotating shaft having a bore extending axially therethrough, a rotor secured to said shaft intermediate the ends thereof and a stator secured within a motor housing and surrounding said rotor;
non-rotatable clamp means supportingly secured to said carriage means, said clamp means being operable to clampingly engage said workpiece, one end of said motor means being directly secured to said clamp means to support said motor means on said carriage means;
a cutting assembly secured directly to the other end of said motor means, and supporting said other end of said motor means on said carriage means, said cutting assembly including a cutting head engaging and removably directly drivingly connected to said rotating shaft whereby said motor means is operative to continuously rotationally drive said cutting head, said cutting head having cutting means movably disposed therein and a bore extending therethrough, said cutting head bore being positioned coaxially with said bore in said rotating shaft whereby said continuously moving workpiece may be fed through said bore to said rotatable head; and
said cutting means being operative to sever said length of stock from said continuously moving workpiece.

12. A flying cutoff machine as set forth in claim 11 wherein said cutting means are radially movable inwardly and outwardly of said bore in said cutting assembly and into engagement with said workpiece.

13. A flying cutoff machine as set forth in claim 12 wherein said cutting means includes a first and second angularly spaced cutting blades each being secured to respective first and second blade carrying members movably disposed within said head.

14. A flying cutoff machine as set forth in claim 13 wherein said workpiece is continuously moved relative to said base and is operative to advance said carriage assembly with respect to said base while said cutting blade operates to sever said length.

15. A flying cutoff machine as set forth in claim 14 wherein said carriage assembly further includes return biasing means operative to return said carriage assembly to a starting position after completion of said cutting operation.

16. A flying cutoff machine as set forth in claim 13 wherein said cutting means further comprises roller means secured to roller carrying means movably disposed within said housing, said roller means and said first and second cutting blades being movable into engagement with said workpiece and cooperating to sever said length.

17. A flying cutoff machine as set forth in claim 16 wherein said first and second blade carrying members and said roller carrying member are pistons, each of said pistons being movably disposed within respective substantially equiangularly spaced radially extending cylinders provided in said head.

18. A flying cutoff machine as set forth in claim 17 further comprising passage means for conducting fluid under pressure to the radially outer end of each of said cylinders, said fluid being operative to urge said pistons radially inwardly so as to substantially simultaneously move said first and second cutting blades and said roller into engagement with said workpiece.

19. A flying cutoff machine as set forth in claim 18 wherein each of said pistons are moved radially outwardly by centrifugal force exerted thereon due to rotation of said head after said fluid pressure is released.

20. A flying cutoff machine as set forth in claim 11 further comprising a stop assembly adjustably supported on said base and spaced from said cutting blade means a predetermined distance, said stop means being engageable by an end portion of said workpiece whereby predetermined lengths of stock may be severed from said workpiece by said cutting blade means, said predetermined length being substantially equal to said predetermined distance.

21. A flying cutoff machine as set forth in claim 11 wherein said means secured to said opposite ends of said motor means comprise first and second end plates, each of said end plates including integrally formed means for supportingly securing said motor means to said carriage means and bearing means for rotatably supporting said shaft.

22. A flying cutoff machine as set forth in claim 11 wherein said motor shaft has an end portion extending axially outwardly from said first end plate and said cutting head is removably secured to said end portion.

23. A flying cutoff machine for severing predetermined lengths of stock from a continuously moving workpiece comprising:
    a supporting base;
    carriage means movably supported on said base for reciprocable movement with respect thereto;
    stop means adjustably secured to said carriage assembly, said workpiece being movable into engagement with said stop means and thereafter being operative to move said carriage assembly from a first position to a second position;
    motor means including a rotatig shaft having a bore extending axially therethrough, a rotor secured to said shaft intermediate the ends thereof and a stator secured within a motor housing and surrounding said rotor;
    non-rotatable clamp means supportingly secured to said carriage means, said clamp means being operable to clampingly engage said workpiece, one end of said motor means being secured to said clamp means to support said motor means on said carriage means;
    a cutting assembly including support means secured to the other end of said motor means and supporting said other end of said motor means on said carriage means and a cutting head engaging and removably directly drivenly connected to said rotating shaft whereby said motor means is operative to continuously rotationally drive said cutting head, said cutting head having a bore extending axially therethrough and disposed in substantially coaxially alignment with said bore in said rotating shaft;
    clamp actuating means associated with said machine and operative to actuate said clamp means in response to initial movement of said carriage means;
    said cutting head including at least one cutting element disposed therein, said cutting element being movable in a radial direction; and
    actuating means for moving said cutting element radially inwardly into engagement with said workpiece so as to sever said predetermined length of stock therefrom, said cutting element being urged radially outwardly in response to centrifugal force resulting from rotation of said head.

24. A flying cutoff machine as set forth in claim 23 wherein said carriage means comprises a pair of elongated members movably supported on said base in substantially parallel spaced relationship and said stop means, said clamp means, said motor means and said cutting assembly are supported therebetween.

25. A flying cutoff machine as set forth in claim 24 further comprising return biasing means operative to bias said carriage assembly from said second position into said first position.

26. In a flying cutoff machine for severing predetermined lengths of stock from a continuously moving elongated workpiece including a reciprocably moving carriage assembly, a cutting assembly secured to said carriage assembly and having cutting means selectively engageable with said workpiece, means engageable with said workpiece and operative to enable relative rotation between said workpiece and said cutting means, motor means secured to said carriage assembly and drivingly connected to said cutting assembly and improved stop means mounted on said carriage assembly, said stop means being engageable by an end portion of said workpiece whereby said workpiece will operate to move said carriage assembly in a first direction while said cutting means operates to sever said predetermied length of stock from said workpiece, said stop means comprising:
    a stop surface engageable with said end portion of said workpiece; and
    a piston assembly including a ram engageable with a sidewall portion of said workpiece, said ram being actuated into engagement with said sidewall portion just before completion of said cutting operation by said cutting means and operative to exert a lateral force thereon so as to separate said predetermined length of stock from said workpiece.

* * * * *

UNITED STATES PATENT AND TRADEMARK OFFICE
CERTIFICATE OF CORRECTION

PATENT NO. : 4,807,502

DATED : February 28, 1989

INVENTOR(S) : Clifford D. Clark and Delbert L. Adkins

It is certified that error appears in the above-identified patent and that said Letters Patent is hereby corrected as shown below:

Column 7, line 40, "filtered" should be -- fitted --.

Column 7, line 63, "bored" should be -- bores --.

Column 13, line 32, claim 23, "rotatig" should be -- rotating --.

Signed and Sealed this

Tenth Day of July, 1990.

Attest:

HARRY F. MANBECK, JR.

*Attesting Officer*    *Commissioner of Patents and Trademarks*